(12) United States Patent
Dunham

(10) Patent No.: US 12,318,851 B2
(45) Date of Patent: Jun. 3, 2025

(54) SUBTRACTIVE MANUFACTURING OF GYROID STRUCTURES

(71) Applicant: Martha L Dunham, Renton, WA (US)

(72) Inventor: Martha L Dunham, Renton, WA (US)

( * ) Notice: Subject to any disclaimer, the term of this patent is extended or adjusted under 35 U.S.C. 154(b) by 0 days.

(21) Appl. No.: 17/969,719

(22) Filed: Oct. 20, 2022

(65) Prior Publication Data

US 2024/0131601 A1    Apr. 25, 2024
US 2024/0227039 A9    Jul. 11, 2024

(51) Int. Cl.
    *B23C 3/16*      (2006.01)

(52) U.S. Cl.
    CPC ...................... *B23C 3/16* (2013.01)

(58) Field of Classification Search
    CPC .......... B23C 3/16; B23K 28/00; B23K 37/00; B23K 9/00; B23K 2101/00; B23P 15/00; F16B 11/006; Y10T 29/49826
    See application file for complete search history.

(56) References Cited

U.S. PATENT DOCUMENTS

| | | | |
|---|---|---|---|
| 2014/0014493 A1* | 1/2014 | Ryan | B01D 61/364 203/49 |
| 2018/0058770 A1* | 3/2018 | Adriany | F02K 9/64 |
| 2021/0346971 A1* | 11/2021 | Codina | B23K 9/1006 |
| 2022/0085399 A1 | 3/2022 | Zimmermann et al. | |

OTHER PUBLICATIONS

Lord et al, Aug. 10, 2003, Periodic minimal surfaces of cubic symmetry, Current Science , Aug. 10, 2003, vol. 85, pp. 346-362 (Year: 2003).*
Macchia, Michael, Mar. 1, 2019, Application of Metamaterials for Multifunctional Satellite Bus Via Additive Manufacturing, Air Force Institute of Technology (Year: 2019).*
Downing et al, Available Online: Aug. 26, 2020, Increased efficiency gyroid structures by tailored material distribution, https://doi.org/10.1016/j.matdes.2020.109096 (Year: 2020).*
Schoen, Alan, Jan. 20, 2022 (Archived), Triply-preiodic minimal surfaces, https://web.archive.org/web/20220120114033/https://schoengeometry.com/e-tpms.html (Year: 2022).*

* cited by examiner

*Primary Examiner* — Nathan L Van Sell
(74) *Attorney, Agent, or Firm* — ARJOMAND LAW GROUP; Farjam Majd

(57) ABSTRACT

A method and an article of manufacture are disclosed for creating 3-D (3-Dimensional) gyroid-based structures such as panels, parts, and components using gyroid building blocks made by subtractive manufacturing (shaping material by removing part of the material, like making a sculpture by shaving wood from a log) that may minimize or maximize heat transfer, compared with a non-gyroid similar structure and depending on application, while maintaining high structural strength and integrity with respect to the intended applications. More specifically, the method includes subtractively manufacturing a variety of basic gyroid building blocks and then attaching the building blocks together to construct larger and more complex 3-D structures while preserving smooth surfaces and same curvature, as further described below. This may not be effectively manufactured by additive manufacturing techniques.

14 Claims, 13 Drawing Sheets ns by the inventor.

SUBTRACTIVE MANUFACTURING OF GYROID STRUCTURES

CROSS-REFERENCE(S) TO RELATED APPLICATION(S)

This application is not related to any other patent applications by the inventor.

TECHNICAL FIELD

This application relates generally to manufacturing. More specifically, this application relates to a method and apparatus for subtractive manufacturing of gyroid-shaped structures.

BRIEF DESCRIPTION OF THE DRAWINGS

The drawings, when considered in connection with the following description, are presented for the purpose of facilitating an understanding of the subject matter sought to be protected.

DETAILED DESCRIPTION

Figure 1:
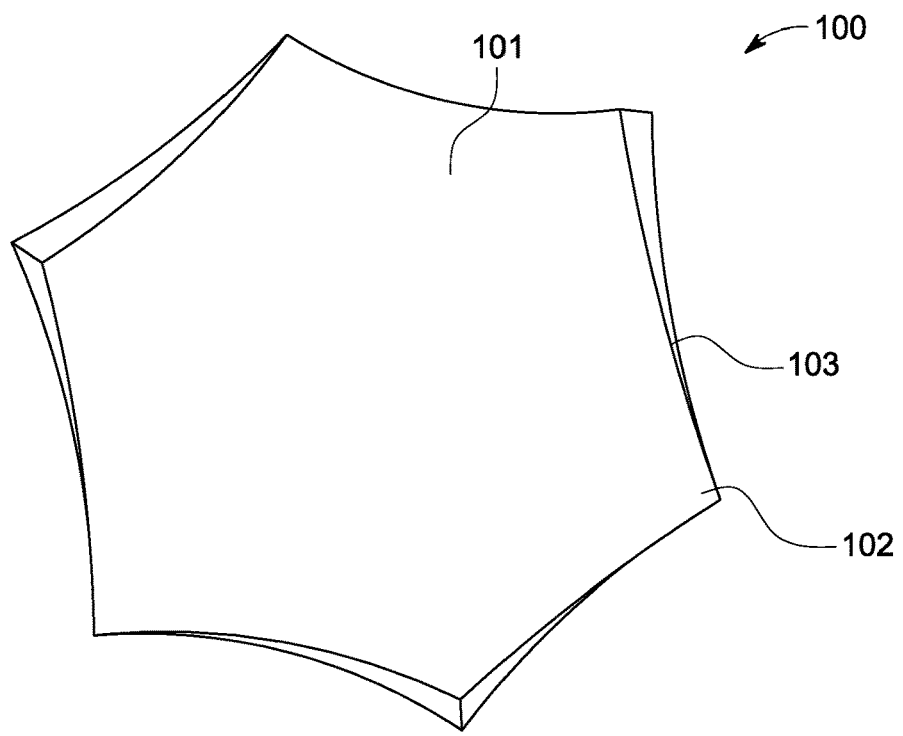
FIG. 1 shows an example skew hexagon.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references particular gyroid shapes, parameters, and applications, it will be appreciated that the disclosure may be applicable to other gyroid parameters and applications.

Briefly described, a method and an article of manufacture are disclosed for creating 3-D (3-Dimensional) gyroid-based structures such as panels, parts, and components using gyroid building blocks made by subtractive manufacturing (shaping material by removing part of the material, like making a sculpture by shaving wood from a log) that may minimize or maximize heat transfer, compared with a non-gyroid similar structure and depending on application, while maintaining high structural strength and integrity with respect to the intended applications. More specifically, the method includes subtractively manufacturing a variety of basic gyroid building blocks and then attaching the building blocks together to construct larger and more complex 3-D structures while preserving smooth surfaces and same curvature, as further described below. This may not be effectively manufactured by additive manufacturing techniques.

Subtractive manufacturing generally refers to cutting away material from an initial material piece, sometimes called a "blank", to form a final part or product. This process is similar to a sculptor creating a human or animal figure from a block of stone by chipping away at the block and removing material, hence the term "subtractive." In contrast, additive manufacturing creates a final part by adding material together. For example, building a concrete wall or using 3-D printing is an additive manufacturing process because material are added and integrated together to create the final product. Each manufacturing method may have advantages and disadvantages depending on the product being manufactured and the application. The factors that affect the choice of manufacturing method depends on speed, cost, intricacy of part' structure and functions, desired or needed material, strength and integrity of finished product, durability, scale of production, quality of finished part and surfaces, cost, and other physical factors.

More specifically, physical characteristics may include strength, conductivity (thermal and electrical), and durability. For example, 3-D printed steel, may require a binding chemical, or binder, to bind steel powder into solid objects. The end-product of this process may contain about 70-80% steel (the rest is binder) and so, may not have the same physical characteristics and specifically not the same physical strength as 100% steel. Also because of the binder, 3-D printed steel may not conduct electricity effectively. The binder may also break down faster in humid conditions and be less tolerant of heat than pure steel. The above is true for 3-D printed bronze, copper and iron, as well. Aluminum, on the other hand, may be 3D printed from aluminum powder by laser sintering, which may provide the same or very similar characteristics as subtractive manufacture or casting of the same parts made from aluminum.

The speed of manufacturing in subtractive methods may be considerably higher than in additive methods. In general, subtractive machines remove material faster than additive machines deposit it. Size of finished product is also less of an issue with subtractive manufacturing methods while part size does affect time to print additively.

Cost of higher volumes of finished products (for example, 100's or thousands of units per month) may also be considerably higher using additive methods, such as 3D printing, than subtractive methods, such as CNC (Computer Numerical Control) machines.

The final surface texture and finish of final products may also be affected by the manufacturing method. Generally, milling produces a more precise and smoother surface with higher tolerances than 3-D printing.

As noted above, subtractive manufacturing, such as machining, milling, cutting, sawing, drilling, lathe cutting (turning), using planers, carving, using routers, sanding, chiseling, and other similar techniques, has certain advantages over additive manufacturing, such as 3-D printing. These advantages may include physical strength of the resulting product, speed of manufacturing, cost, and material properties, among others. However, subtractive manufacturing of a complex shape like a gyroid structure may encounter a certain set of problems. One of these problems is the access of the cutting tool of a manufacturing machine, such as a milling machine, to the surface to be cut and the material to be removed. To cut and form the curves of a gyroid, the direction of cutting is continuously adjusted to follow the mathematical contours of the gyroid. As the surface contours of the gyroid lead deeper and deeper into the inner body of the gyroid structure, it will be more and more difficult for the cutting tool to follow. This is especially probable and clear in a high-density gyroid structure having an exponential value n higher than 1, where physical access of the cutting tool to a next point on the surface to be removed is obstructed and restricted by other surface areas of the gyroid. In effect, to continue cutting and shaping the surface of the gyroid, the cutting tool follows some passages (like a Gyroid Pipe, described below) in the gyroid. So, while cutting one side or surface of the passage to extend the passage inside the body of a gyroid cube, the opposite side or surface of the passage may limit the access of the cutting tool or its support base or connection to the cutting machine to the side being cut.

Because of the obstructions faced by the cutting tool in extending the passages, the gyroid structure body may be manufactured by subdividing a complete gyroid structure into several partial sections later attached to each other, for example, by gluing or welding, to form the complete gyroid structure. Each partial section of a gyroid structure has shallower and shorter passages than the whole structure. In this context, the term "shallow" indicates a smaller distance between the surfaces of the structure and the interior center of the structure relative to a deeper or greater distance. As such, a partial section, when sufficiently shallow and exposed, may be subtractively manufactured as one piece because the cutting tool can reach all surfaces and passages from outside.

A gyroid structure may be viewed as being a compound structure formed by joining multiple building blocks together including a patch, 12 of which may be combined to create a skew hexagon, which has a hexagonal shape. Four skew hexagons may then be combined to make one cubic Unit Cell. The subtractive manufacturing disclosed herein may be used to construct 8 cubic Unit Cells at once as 2×2×2 structure (2 Unit Cells in each of the three dimensions) and may be extended in one dimension to construct 4×2×2 structure, or 8×2×2 structure, and the like. Such basic manufacturing units may then be assembled into bigger gyroid structures of various dimensions and shapes.

The extent of the subdivision of the gyroid structure depends on the density (determined by the value of n in Eq. 4; described below) of the gyroid structure. The higher the density, the larger the number of subdivisions or partial sections. The partial sections may be defined by parallel surfaces to form sub-cubic or sub-rectangular cubic sections or by curved or flat planes bounding the partial sections. The determination of the bounding surfaces of partial sections depends on the overall shape and density of the whole gyroid structure and other considerations such as minimized seam lengths when attaching the partial sections together to form the whole structure.

Gyroid Fundamentals and Building Blocks

Gyroids have certain geometric and mechanical properties that make them useful in many applications. Gyroids are mathematically defined geometric surfaces that have maximum or near maximum surface area per unit volume of the structure they form. Gyroids have curved surfaces with an approximately fixed curvature, such as 38.02 degrees. The surface curvature, in practical manufacturing and application may vary by about 5% from 38 degrees. Gyroid structures also have light weight for the material volume and amount of surface area. Gyroid structures are also mechanically strong for the volume and weight of the material used to construct them. The strength property is similar to honeycomb structures which are stronger relative to other structures built from the same amount (weight and/or volume) of material.

At present, gyroid-shaped structures are created by additive manufacturing, such as 3-D printing. Patents based on these gyroid-shaped structures indicate they are to be created by additive manufacturing.

Generally, a gyroid-like surface obeys the following equation (Eq.):

$$\cos x \sin y + \cos y \sin z + \cos z \sin y = 0 \qquad \text{Eq. (1)}$$

Gyroid surfaces may obey other mathematical equations and relationships in addition to Eq. (1), in which x, y, and z are length parameters on the x-axis, y-axis, and z-axis defined in a Cartesian reference frame, respectively.

Various types of gyroid-shaped structures may exist. Four basic units of the gyroid-shaped structures may be described as follows. Fundamental Patches (FP) are the most basic constituents from which other building blocks are constructed. A taxonomy of gyroid structures is defined below. The details are described later with reference to the figures. The taxonomy below is not unique and may be organized or classified in other ways. The following listing shows some types of basic gyroid structures, some of which have subtypes referred to as Type I and Type II. For example, other structures and components may be designed and added based on gyroid building blocks.

1. Fundamental Patches (FP): Basic constituents of gyroids
2. Skew Hexagon (SH): Made from FP
3. Gyroid Unit (GU): Made from two SHs
   a. GU Type I
   b. GU Type II
   c. There are six (6) ways to combine two GUs with each other
   d. Gyroid Pipe (GP): Made from two or more GUs of the same type (Type I or Type II) to obtain a pipe of desired length
   e. Gyroid Stock (GS): Made from two or more GUs to desired length 4. Triunit (TU): Made from GU and SH
   a. TU Type I
   b. TU Type II
   c. There are 28 ways to combine two TUs
5. Unit Cell (UC): Made from two GUs
   a. Pipe: Made from GUs to make a GP with any length
   b. Unit Cell Pairs: Made from two or more UCs, as four skew polygons, and more specifically skew hexagons joined at their respective vertices Skew Hexagon (SH) may be composed of 12 Fundamental Patches, described mathematically. A Gyroid Units (GU) may be constructed from two skew hexagons both with the same side up, such that a continuous surface is formed. The GU structures are further divided into Type I and Type II GU as described later herein.

Assembly of Gyroid Building Blocks Into 3-D Structures

As briefly noted above and mentioned in the taxonomy of gyroid structures, a number of predefined gyroid-based structures may be made from the basic gyroid building blocks (SH, GU, TU, UC), including GP, and UC-based pipes. Additionally, any gyroid structure, basic or compound, may be considered as a building block for a larger gyroid structure. These are specifically described later with respect to various figures. Certain constraints apply for the assembly of gyroid building blocks into bigger and more complex structures. The basic gyroid properties recounted above need to be maintained to preserve the advantages of gyroids. These properties include basic gyroid geometric properties including constant curvature, and no abrupt changes at boundaries between smooth surfaces. In turn, preservation of these properties necessitate that the building blocks are joined together in particular ways and at particular sides and vertices, as detailed later. The building block and assembly approach of manufacturing allows subtractive manufacturing of the building blocks and assembly into arbitrary 3-D structures of higher complexity and bigger size. The thickness of the component parts of the gyroid-shaped structure is determined by the intended use of the structure.

Various gyroid building blocks are polygons that have vertices and sides between the vertices that may be identified specifically for a gyroid building block. Each of the sides of the different gyroid building blocks may be matched or mapped together in a specific way to create a larger and more complex gyroid-based structure. Attachment of arbitrary sides of different gyroid building blocks may not result in a larger compound true gyroid structure, having the gyroid characteristics described herein because the surface curvature of the compound gyroid structure may not stay fixed and consistent with the gyroid components forming the compound gyroid structure. For example, particular sides of a first gyroid building block and particular sides of a second gyroid building block may be mapped to correspond together. When these particular sides are joined, for example, by glue, electrode welding (for metals), chemical welding, or other techniques, the first and second gyroid building blocks form a particular larger gyroid-based structure, such as a Gyroid Pipe, described later herein.

To maintain the fixed gyroid curvature of the gyroid building blocks in the larger gyroid-based structure, the seam or joint formed when two sides of the first and second gyroid building blocks are attached, is formed in a way that does not create a discontinuity in the surface leading from the first gyroid building block to the second gyroid building block. The transition across the joint becomes a smooth part of the larger surface of the gyroid-based structure.

Subtractive manufacturing may have advantages in applications that require high strength and electrical conductivity, because no binder is used in the final product. Subtractive manufacturing may also have advantages in speed of production, production of large items, higher tolerances, greater durability, and lower cost.

Gyroid structures, as other 3-D structures, may be created by additive manufacturing, such as 3-D printing. However, for some of the reasons discussed above, it is desirable to manufacture gyroid structures by subtractive methods. However, it is difficult to produce accurate, high-integrity, and high-quality gyroid structures using the subtractive method due to the gyroid's complex and inaccessible contours. The cutting tool, such as a mill bit, in a subtractive manufacturing machine may not be able to create and reach all passages and surfaces of a gyroid which constitute its structure.

Gyroid structures are a type of cellular structures, like honeycomb structures, that generally have special or enhanced physical properties including good thermal insulation, light weight, and high strength to weigh ratios. There are generally two types of cellular structures: those with open cells like some foam structures and those with closed cells like honeycombs. In an open cell structure, adjacent cells may be connected and share a common space unobstructed by cell walls. Closed cells are completely enclosed by cell walls and cut off from other adjacent cells. These physical properties are highly dependent on the shape, topology, and relative density of the cells forming the structure. For example, a thick layer or panel made from a solid material such as various plastics, paper (such as heavy cardboard), and other synthetic materials may have less desirable physical properties than a cellular panel with the same dimensions made from a cellular structure. The weight of the solid panel, which depends on material density, will be several times the weight of a panel having largely hollow (air-filled, for example) structure. The thermal conduction between outer walls of the solid panel will also be higher than the cellular panel because the thermal exchange surfaces and thermal paths are greater than a cellular panel. Similarly, the strength to weight ratio will be much lower in a solid panel compared with a cellular panel. The cost of material may also be higher in solid panels due to the amount of material used.

A gyroid cellular structure has all of the general properties of the cellular structures discussed above plus other characteristics that makes it more suitable for some applications. Gyroid has a relatively small surface area needed to span a region of space and it has no straight lines anywhere. A gyroid shape is entirely made of curved lines and surfaces. Because of its small surface area and curved surfaces, a gyroid structure also may have minimal internal and maximal external thermal conduction properties because heat is transferred through surfaces. This is further described below.

More specifically, a gyroid structure has particular heat transfer properties. A gyroid structure in the shape of a wall has high resistance to heat transfer and transfers less heat from one side of the wall to the other side compared with a wall made from solid material. More generally, any shape structure with sidewalls that enclose the structure and has a large proportion of hollow space relative to the internal walls, cells, or members (such as tiny walls surrounding honey-comb cells) that connect the sidewalls together because there is narrower path for the heat to transfer from one sidewall to another. However, the heat transfer properties between internal spaces (for example, Gyroid Pipes) of a gyroid structure separated by gyroid curved surfaces is greater relative to non-gyroid hollow spaces because the curved surfaces increase heat transfer surface between the internal spaces. So, if a gyroid structure with separate internal spaces is filled with a conductive gas (like air or other gases), then it may have good conduction properties through the gas. As such, a gyroid structure may have various uses for various applications.

The shape of a gyroid structure may be mathematically approximated by the following equations (Wohlgemuth et al. 2001, Scherer 2013):

$$FSG(x,Y,z)=t \qquad \text{Eq. (2)}$$

$$\sin((2\pi/L)x)\cos((2\pi/L)y)+\sin((2\pi/L)y)\cos((2\pi/L)z)+\sin((2\pi/L)z)\cos((2\pi/L)x)=t \qquad \text{Eq. (3)}$$

Where L is the cubic cell length and t=0 for the minimal gyroid. The variables x, y, and z are the three spatial dimensions that together define the coordinates of all points on the surface of the 3-D gyroid shape.

The mechanical properties of a gyroid structure is dependent on its density. The following exponential equation shows how the mechanical properties vary with the exponent n of the density:

$$P^*/P_s=\alpha[(D^*/D_s)]^n \qquad \text{Eq. (4)}$$

Where P* is a mechanical property of the gyroid, such as strength or thermal conductivity, Ps is the mechanical property of the bulk material the gyroid structure is made of, α is a proportionality constant, D* is density of the gyroid structure, and Ds is the density of the bulk material the gyroid structure is made of, and n is the exponent. By varying the exponent n different cellular gyroid structures are obtained with different densities.

In various embodiments, a method of manufacturing of a gyroid structure is disclosed including subtractively manufacturing multiple gyroid building blocks having surfaces, vertices and sides, and identifying the vertices and sides of the gyroid building blocks that are joined together to create larger gyroid-based structures. The method further includes mapping the sides from different gyroid building blocks that when joined create a particular type of the larger gyroid-based structure, and joining the different gyroid building blocks at the mapped gyroid building blocks vertices and sides to form the larger gyroid-based structure.

In various embodiments, articles of manufacture are disclosed including multiple gyroid building blocks having curved surfaces and sides that are joined together at predetermined sides to create a three-dimensional (3D) larger gyroid-based structure. The surface of the gyroid-based structure has approximately the same curvature as the surfaces of the gyroid building blocks.

In various embodiments, a method of manufacturing a gyroid structure is disclosed including making a first basic gyroid structure and a second basic gyroid structure using subtractive manufacturing techniques. All surfaces of the first and the second basic gyroid structures may be curved. The method further includes matching one or more sides of the first basic gyroid structure with one or more sides of the second basic gyroid structure, and joining the matched one or more sides of the first basic gyroid structure with the matched one or more sides of the second basic gyroid structure to create a larger compound gyroid structure.

Given the desirable physical properties of gyroid structures, a practical, high-quality, and high speed subtractive manufacturing method is needed to make parts having gyroid structures. It is to be noted that directions, orientations, and other relative terms such as "front", "back", "top", "bottom", "left", "right", "inside", "outside", "interior", "exterior", "downward", "upward", "front-facing", "down-facing", "vertical", "horizontal", "diagonal", and the like are described with respect or relative to a distinguishing feature of the system or device body itself. For example, if the front part or surface of a system body or an object is identified in the description, then rear or back is defined as the part or surface opposite the front surface, left is defined as the left side when looking into the front surface, and so on. As long as directions are unambiguously identifiable based on the descriptions and figures, how the orientations are defined is immaterial.

In the following descriptions, conventional notations are used. Namely, vertices of polygons are numbered and the sides between the vertices are identified as "vertex1-vertex2", where vertex1 and vertex2 are vertex numbers. For example, if vertices in a polygon are labeled as 1, 2, 3, 4, 5, 6, then 2-3 and 5-6 signify sides or edges between vertices 2 and 3 and vertices 5 and 6, respectively. On occasion a decimal notation may be used, such as 2.5-3, which signifies a fraction of a side. So, 2.5-3 means half of side 2-3 because 2.5 signifies that the intended side is some distance after vertex 2.

FIG. 1 shows an example skew hexagon. In various embodiments, a top view 100 includes a skew hexagon 101, a vertex 102, and a side 103.

A skew hexagon is a 6-sided skew polygon. An N-sided skew polygon includes N vertices and N sides between the vertices, where N is a positive integer. The vertices of a skew polygon are not all coplanar. Such skew polygons define a 3-D surface. In relevant literature, the edges of the skew hexagon each form ¼ (a quarter) turn of a helix, alternating convex and concave, and are cut to make the contour of the cut edge approximately orthogonal to the surface of the patch. The angle between the cut edge and surface may be plus or minus some angle, for example, about 10 degrees, from perpendicular to allow more flexibility in manufacturing and better alignment when joining the cut edges together. Those skilled in the art will appreciate that a concave surface encloses a volume between its surfaces (like a bowl), while a convex surface does not. Also, for a sheet of material that is concave or convex, the opposite side will be convex or concave, respectively. So, a sheet of material may be concave and convex simultaneously depending on which side is being looked at. Thickness of the material of the skew hexagon is determined by intended use. Skew hexagons are stackable either with same side up or mixed or different sides up, up and down being relative orientations, as long they are consistently referenced.

Figure 2:
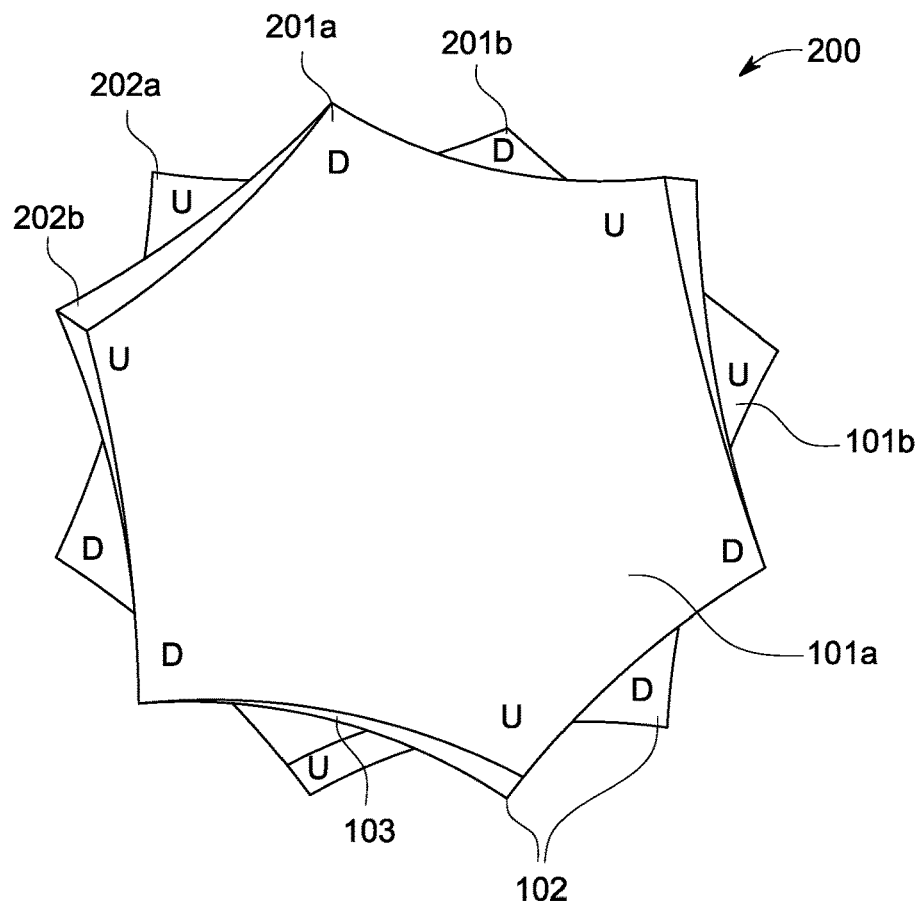
FIG. 2 shows an example stacked skew hexagons with alternating sides up formed from skew hexagon of FIG. 1.

FIG. 2 shows an example stacked skew hexagons with alternating sides up formed from skew hexagon of FIG. 1. In various embodiments, the stacked skew hexagons 200 include a first or upper skew hexagon 101a and a second or lower skew hexagon 101b, vertices 102 and edges 103 of the hexagons, down-vertex 201a (labeled "D") of upper skew hexagon 101a, down-vertex 201b of the lower skew hexagon 101b, up-vertex 202a (labeled "U") of lower skew hexagon 101b, and up-vertex 202b of the upper skew hexagon 101a.

In a skew polygon, such as a skew hexagon, the down-vertices and up-vertices may be defined with respect to the center or centroid of the polygon. The down-vertices and the centroid point will form a partially concave surface or volume when looking from the down-vertex towards the centroid, while the up-vertices and the centroid point will form a partially concave surface or volume when looking from the up-vertex towards the centroid. The same surfaces or volumes will be partially convex or concave on their back sides. Hence, looking at the skew hexagon from one side both concave and convex surfaces will be visible. The overall surface of the skew hexagon on one side may look like adjacent hilltops that go up and down. A surface may be both partially concave and partially convex, like a 3-D saddle-point curve. Once a plain for the centroid is defined (a plain may be defined by one point and a perpendicular vector, called a normal vector, passing through that point), then the up and down direction may be defined. The up direction is in the same direction as the normal vector and the down direction is opposite the direction of the normal vector.

With reference to FIG. 2, the vertices are labeled U (up) and D (down), and the edges or sides of the skew hexagon between the vertices are referenced as U-D or D-U. The edge U-D means the edge encountered when traversing the perimeter of the skew hexagon from a U vertex towards a D vertex. Similarly, the edge D-U means the edge encountered traversing the perimeter from a D vertex towards a U vertex.

In some embodiments, the U and D vertices alternate when traversing the perimeter of the skew hexagon. In some embodiments, the upper and lower skew hexagons, 101a and 101b, respectively, may be stacked such that their U and D vertices are not aligned, as shown in the figure. For example, the lower skew hexagon 101a may have its vertices aligned with the edges of the skew hexagon 101b, and vice versa. This way, a D vertex of the lower skew hexagon 101b may appear between two vertices U and D of the upper skew hexagon 101a, as shown.

Figure 3A:
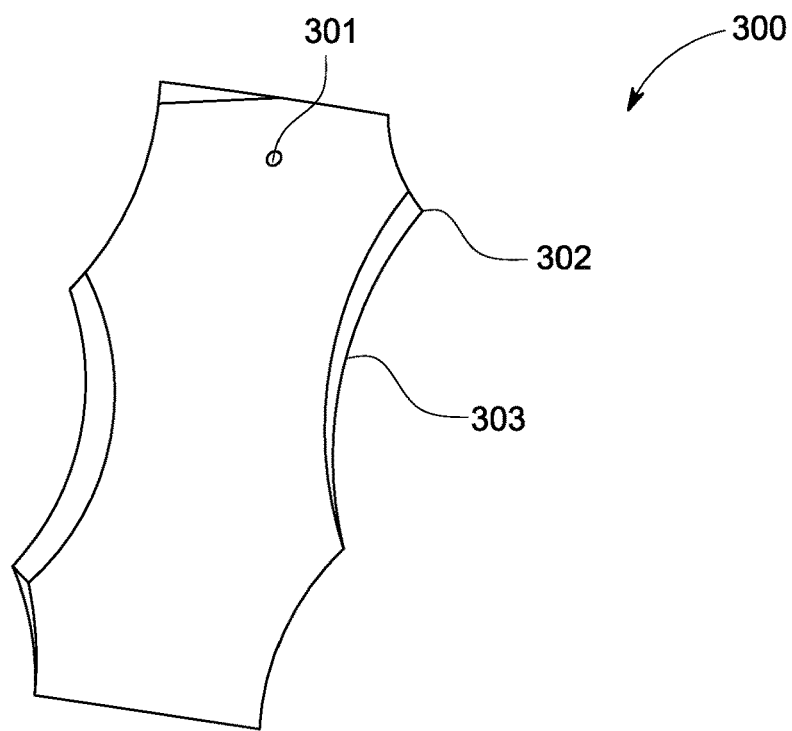
FIG. 3A shows Type I Gyroid Unit.

FIG. 3A shows Type I Gyroid Unit. A view 300 of the Type I Gyroid Unit (GU) includes the Type I GU 301, a vertex 302, and a side 303.

There are two ways to construct the GU from two skew hexagons, Type I and Type II. A Type I GU is created when the skew hexagons are connected along the U-D edges or sides, when traversing the skew hexagon clockwise. This arrangement creates a particular curved surface on Type I GU.

There are six (6) ways to attach two GUs to each other: two along long edges (343a or 343b or side a), and four along short edges (344a, 344b, and 344c, or b, b' and b" sides, respectively). These six attachment configurations are summarized below:
  i. Two GUs joined at sides a to a form the Unit Cell (UC). When GUs are repeatedly joined at sides a to a, a Gyroid Pipe (GP) is formed.
  ii. midpoint of a to midpoint of a (staggered attachment)
  iii. b to b
  iv. b' to b' (Note: b' to b' edges can also be joined repeatedly to form GS);
  V. b" to b"
  vi. b to b"

Figure 3B:
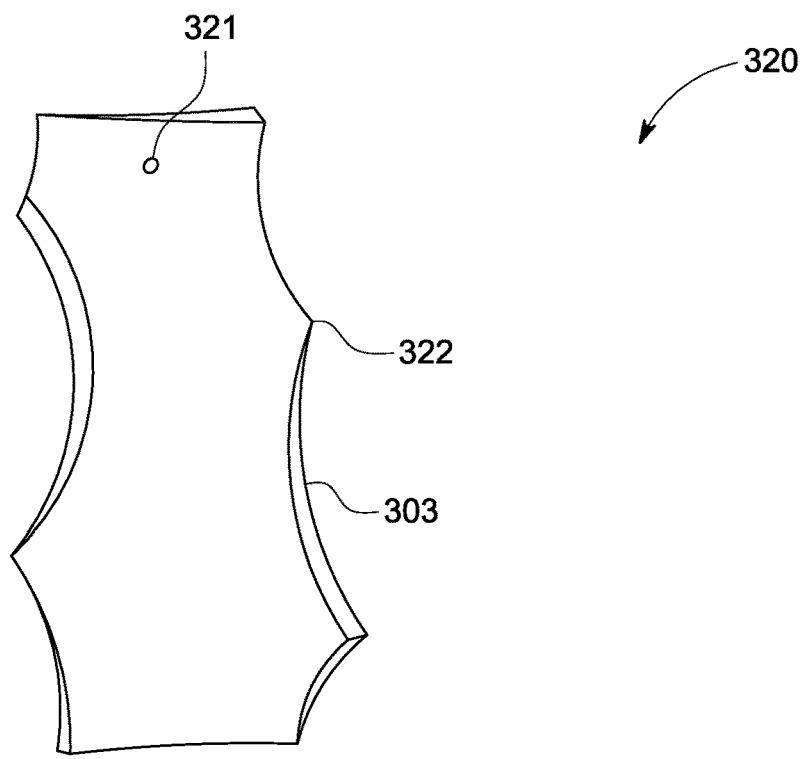
FIG. 3B shows an example Type II Gyroid Unit.

FIG. 3B shows an example Type II Gyroid Units. A view 320 of the Type II GU includes the Type I GU 301, a vertex 302, and a side 303.

As noted above with respect to FIG. 3A, there are two ways to construct the GU from two skew hexagons, Type I and Type II. A Type II GU is created when the skew hexagons are connected along the D-U edges or sides, when traversing the skew hexagon clockwise. This arrangement creates a particular curved surface on Type II GU that is distinct and different from Type I GU. This difference is visible when comparing FIGS. 3A and 3B. The Type I and Type II GUs shown in these figures are mirror images of each other along the longitudinal axis (along the longer dimensions of the GU from top to bottom of the drawing sheet).

Figure 3C:
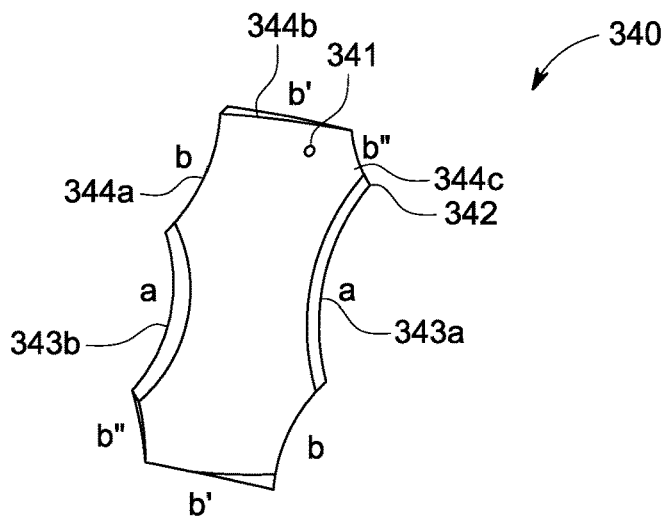
FIG. 3C shows an example Type I Gyroid Unit with sides labeled.

FIG. 3C shows an example Type I Gyroid Unit with sides labeled. The labeled view 340 of the GU Type I 301 (see FIG. 3A) includes, GU 341, vertex 342, long side (or edge) 343a (tabled as "a" in the figure) and short sides 344a ("b"), 344b ("b'"), 344c ("b''").

In various embodiments, Type I and Type II GUs may be combined by joining GUs along the short sides or long sides as further discussed below.

Figure 4A:
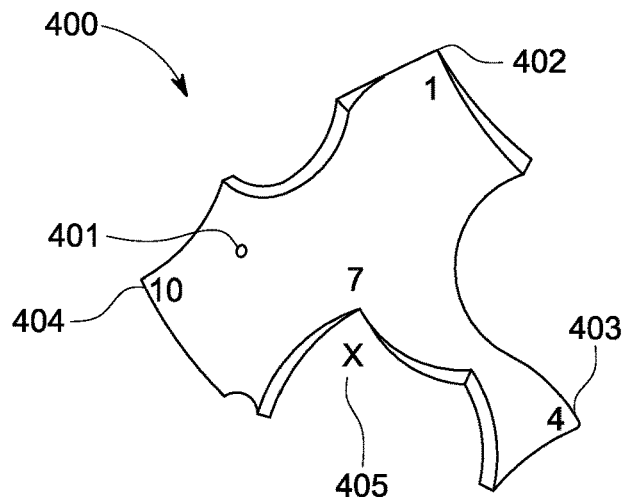
FIG. 4A shows an example Type I Triunit.

FIG. 4A shows an example Type I Triunit. View 400 includes Type I Triunit 401, vertices 402 (labeled as "1"), 403 ("4"), and 404 ("10"), inner corner 405 ("X").

Type I Triunit 401 may be formed by joining a GU and an SH at middle of side 343a (a) either along paths a-b" or a-b (see FIG. 3C). Type I Triunit 401 is constructed by joining a GU at side 343a (a) along the path a-b", as shown in the figure.

Figure 4B:
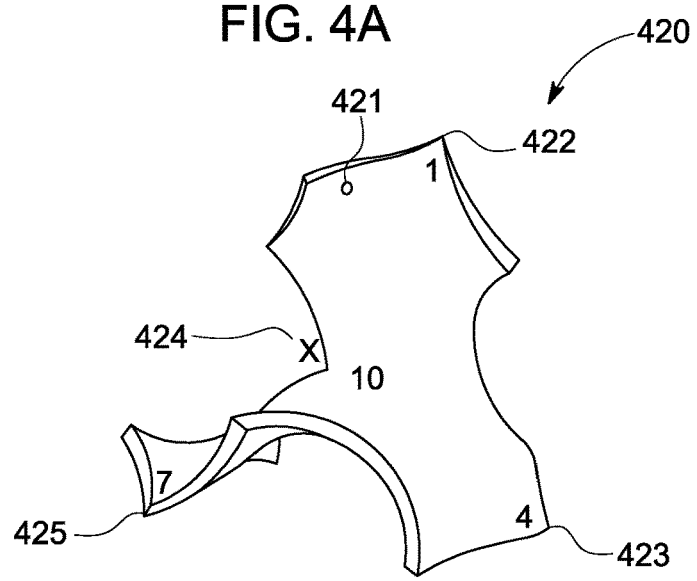
FIG. 4B shows an example Type II Triunit.

FIG. 4B shows an example Type II Triunit. View 420 includes Type II Triunit 421, vertices 422 (labeled as "1"), 423 ("4"), and 425 ("7"), and inner corner 424 ("10" and "X").

Type II Triunit 421 may be formed by joining a GU and an SH at middle of side 343a (a) by joining a GU at side 343a (a) along the path a-b, as shown in the figure.

Figure 5:
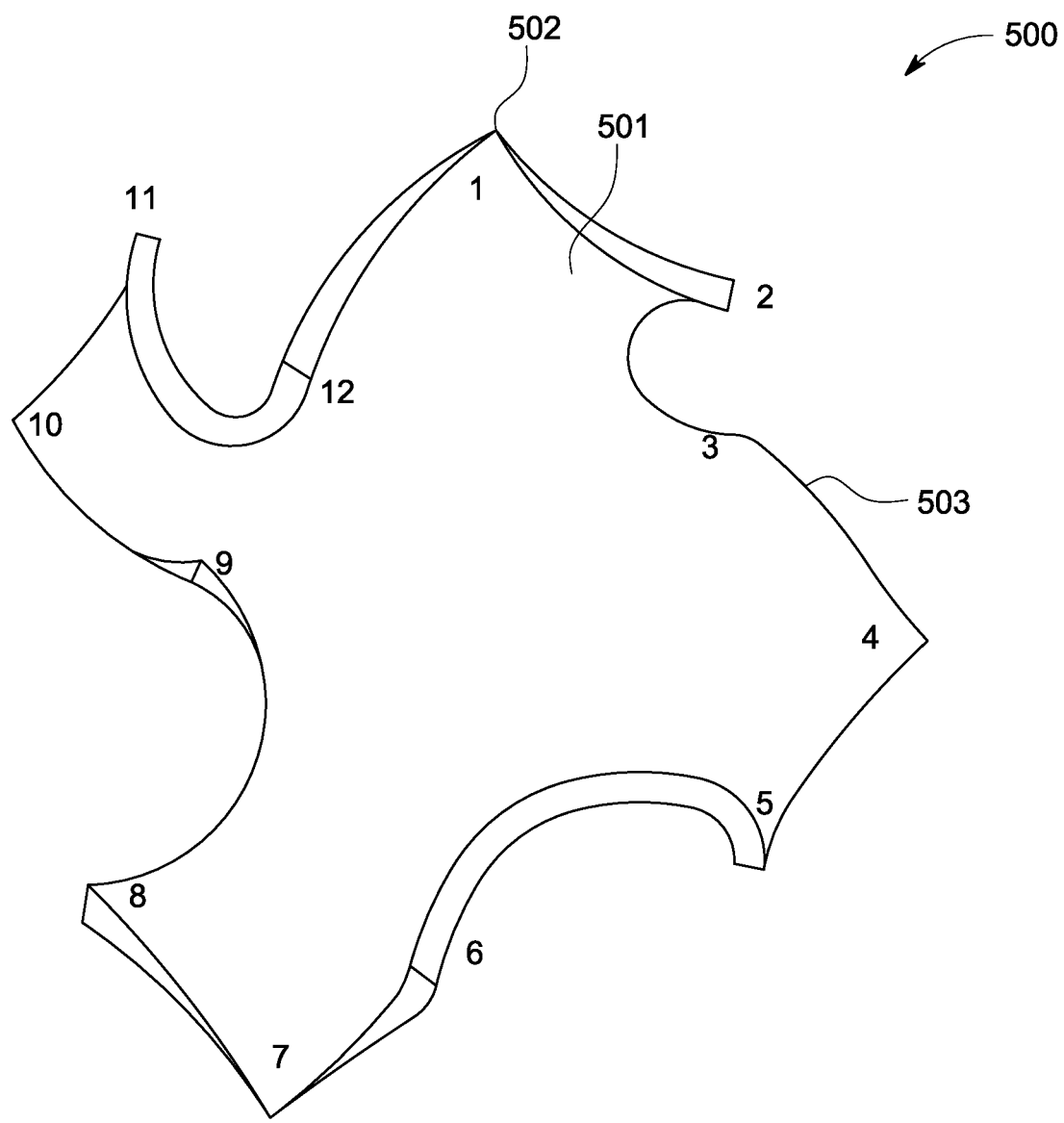
FIG. 5 shows an example Unit cell composed of four skew hexagons as shown in FIG. 1, with vertices labeled.

FIG. 5 shows an example Unit cell composed of four skew hexagons as shown in FIG. 1, with vertices labeled. View 500 includes UC 501, vertex 502, and side 503. Vertices are also labeled as 1 through 12, as shown in the figure.

A UC may be formed by joining two GU along the long sides 343a to 343a (a to a) of the respective GUs, as shown. The four skew hexagons that form the two GUs are thus joined such that their four vertices meet at the approximately center point of the UC.

Figure 6A:
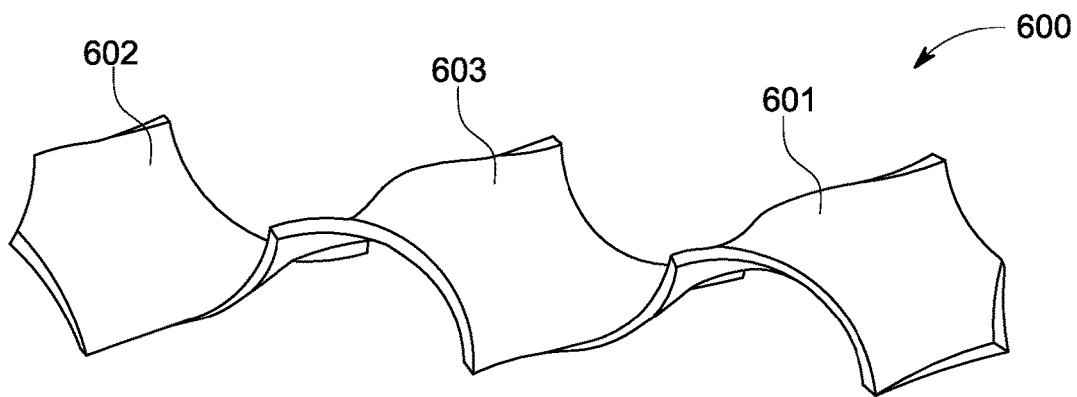
FIG. 6A shows an example side view of a gyroid Stock of length 2.5 Gyroid Units.

FIG. 6A shows an example side view of a Gyroid Stock of length 2.5 Gyroid Units. Side view 600 includes a first GU 602, a second GU 603, and a ½ (half) GU 601.

Gyroid Stock (GS) may be constructed from GUs iteratively joined along the sides 344b (b'), as shown. GS can be milled and extended to the desired length, cut as needed, and joined by appropriate methods. GS is formed by joining GUs along the b' edge, extended to the desired length. There is only one type of GS, which is formed by joining the end sides 344b of different GUs. The ½ GU 601 is a SH.

Figure 6B:
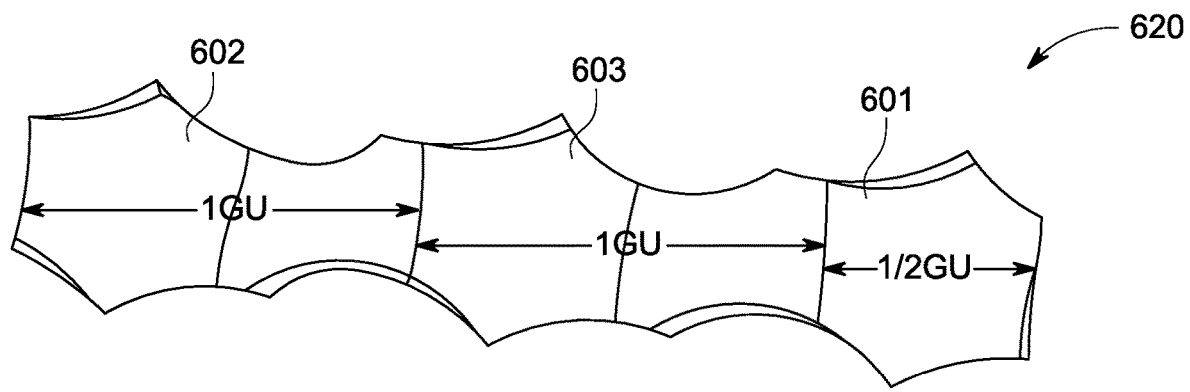
FIG. 6B shows an example top view of a gyroid Stock of FIG. 6A.

FIG. 6B shows an example top view of a gyroid Stock of FIG. 6A. The top view 620 includes the first GU 602, the second GU 603, and the ½ GU 601.

Figure 7A:
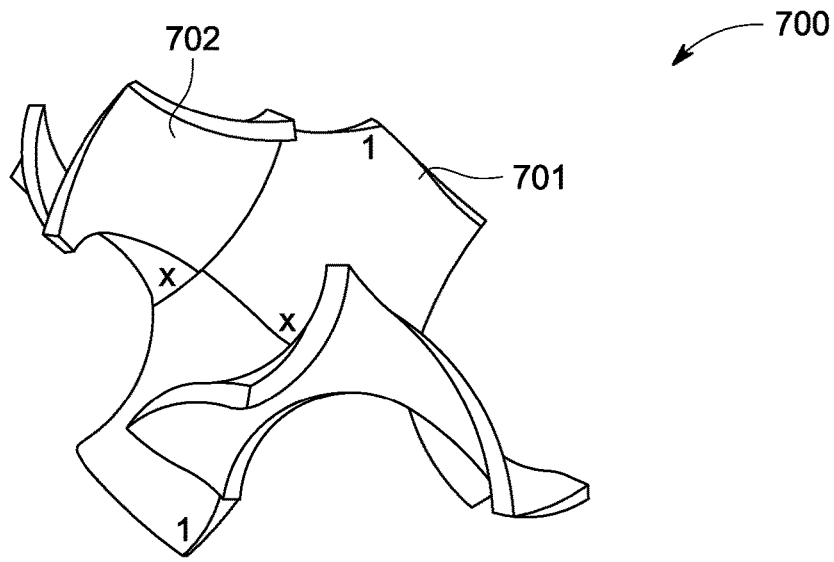
FIG. 7A shows an example first method of assembling Triunits together.

FIG. 7A shows an example first method of assembling Triunits together. The Triunit (TU) configuration 700 includes TUs 701 and 702, with vertices 1 and X, as shown. This method is for assembling two Triunits together.

TUs may fit together in 28 configurations including eight configurations of TU Type I joined with TU Type I, eight configurations of TU Type II joined with TU Type II, and 12 configurations of TU Type I joined with TU Type II. The TUs may be formed from GUs and SH. These configurations are summarized below and selected ones are described in more detail below with respect to FIGS. 7B and 7C. The vertex and numerical labels for the sides are best understood with reference to FIGS. 4A, 4B, and 5.

A. TUs Coupling together: Type I to Type I
  1. Vertex 2 to X
  2. Vertex 4 to X
  3. Vertex 10 to X
  4. Vertex 12 to X
  5. Vertices 5-6-7-8 to 5-6-7-8
  6. Vertices 6-7-8-9 to 6-7-8-9
  7. Long sides 11-12 to 11-12

8. Long sides 2-3 to 2-3
B. TUs Coupling together: Type II to Type II
9. Vertex 1 to X
10. Vertex 3 to X
11. Vertex 5 to X
12. Vertex 7 to X
13. Vertices 8-9-10-11 to 8-9-10-11
14. Vertices 9-10-11-12 to 9-10-11-12
15. Long sides 5-6 to 5-6
16. Long sides 2-3 to 2-3
C. TUs Coupling together: Type I to Type II
17. Type I vertex 1 to Type II X
18. Type I vertex 3 to Type II X
19. Type I vertex 5 to Type II X
20. Type I vertex 9 to Type II X
21. Type I vertex 11 to Type II X
22. Type II vertex 1 to Type I X
23. Type II vertex 4 to Type I X
24. Type II vertex 6 to Type I X
25. Type II vertex 8 to Type I X
26. Type II vertex 12 to Type I X
27. Long sides Type I 2-3 to Type II 2-3
28. Long sides Type I 11-12 to Type II 5-6.

If both TU are the same type, of those eight configurations, four join one TU at the two edges on either side of vertex X to the second TU on another side or edge. Two of the eight configurations join both TUs at vertex X. And two other configurations join the TUs along the long sides (edge a; see FIG. 3C).

In TU Type I (X shown at vertex 7; see FIGS. 4A and 5) vertices 2, 4, 10, or 12 are connected to X. Vertices 5-6-7-8 to 5-6-7-8; Vertices 6-7-8-9 to 6-7-8-9; and long sides 11-12 to 11-12; and 2-3 to 2-3. Similarly, Type II (X shown at vertex 10; see FIGS. 4B and 5) connects vertices 1, 3, 5, or 7 to X and vertices 8-9-10-11 to 8-9-10-11. Also, sides 9-10-11-12 are joined with sides 9-10-11-12 or with long sides 5-6 to 5-6, or side 2-3 to side 2-3.

ii. If the TUs are Type I and Type II, of those 12 configurations, 10 join one Triunit at the two edges on either side of X to the second Triunit elsewhere; two join along the long sides.

Type I connects Vertices 1, 3, 5, 9, or 11 to Type II at X; Type II connects Vertices 1, 4, 6, 8, or 12 to Type I at X; or long sides connect 2-3 to 2-3 or 11-12 (Type I) to 5-6 (Type II).

Figure 7B:
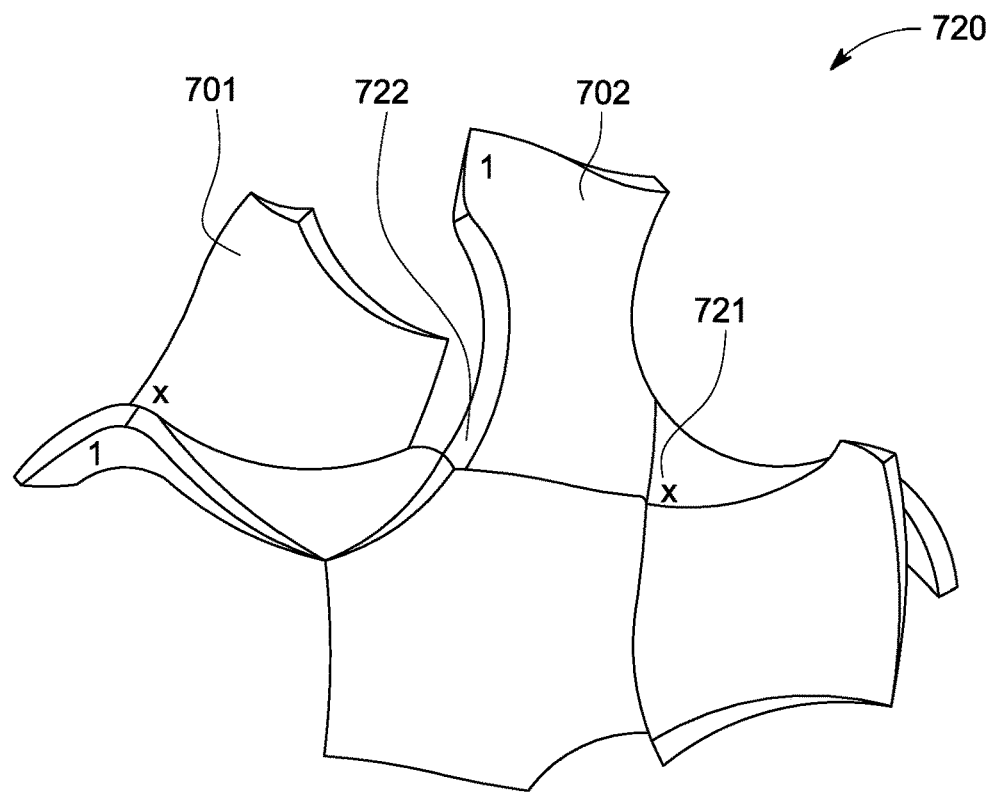
FIG. 7B shows an example second method of assembling Triunits together.

FIG. 7B shows an example second method of assembling Triunits together. The TU configuration 720 includes TUs 701 and 702, edge 722, and vertices 1 and X.

The configuration shown in this figure is another way to assemble TUs together.

Figure 7C:
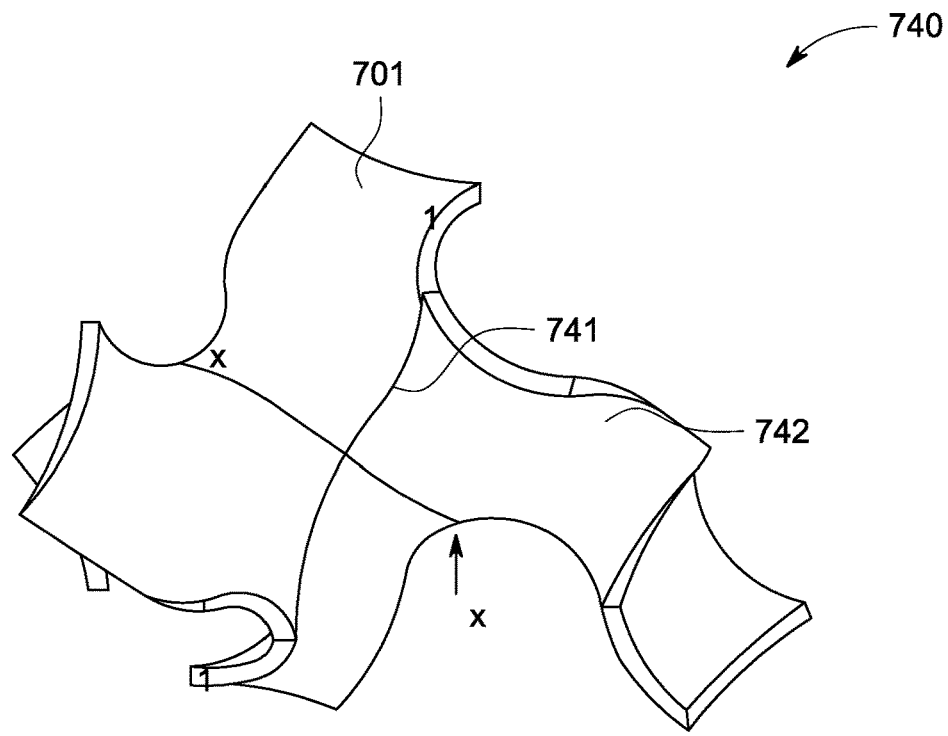
FIG. 7C shows an example third method of assembling Triunits together.

FIG. 7C shows an example third method of assembling Triunits together. The TU configuration 740 includes TUs 701 and 742, edge 741, and vertices 1 and X.

The configuration shown in this figure is another way to assemble TUs together.

Figure 8A:
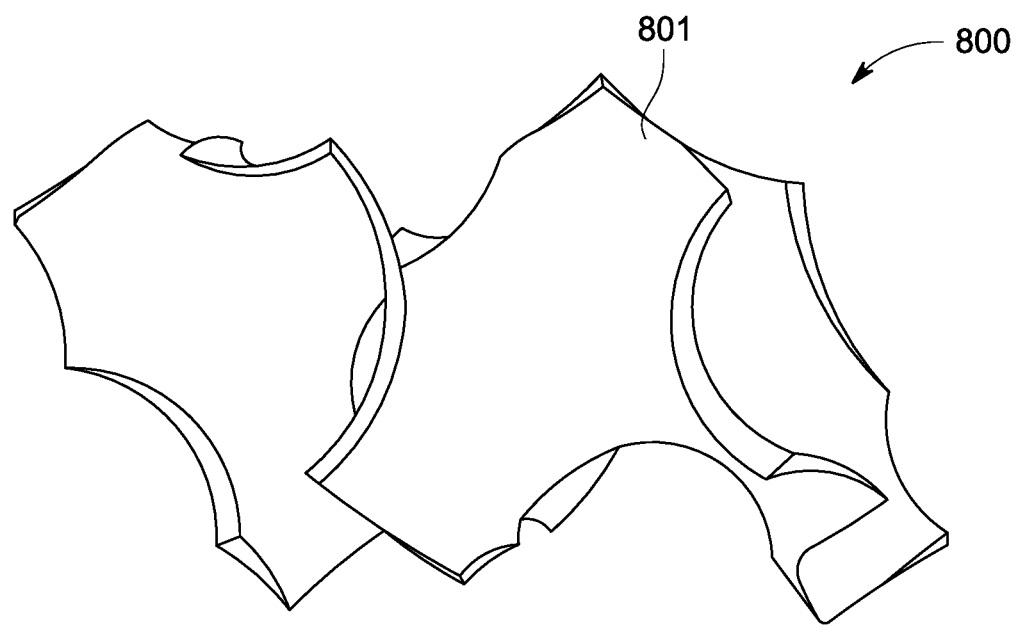
FIG. 8A shows an example Type I Gyroid Pipe.

FIG. 8A shows an example Type I Gyroid Pipe. The configuration 800 includes a Type I Gyroid Pipe (GP) 801.

GP may be constructed from GUs iteratively joined along long sides 343a or 343b (edge a). GP has two types: Type I and Type II. Type I GP is formed such that curvature of the GUs attached create a right-handed or clockwise (CW) helix extending along the length of the GP. Type II GP is formed such that curvature of the GUs attached create a left-handed or counter-clockwise (CCW) helix.

GPs may be constructed by joining two GUs of the same type (either both Type I or both Type II) along either long edge a (343a or 343b). A GP of desired length may be obtained by repeating the same process joining GUs long side (a) to long side until the desired length and type of GP is attained, in this case, Type I.

Figure 8B:
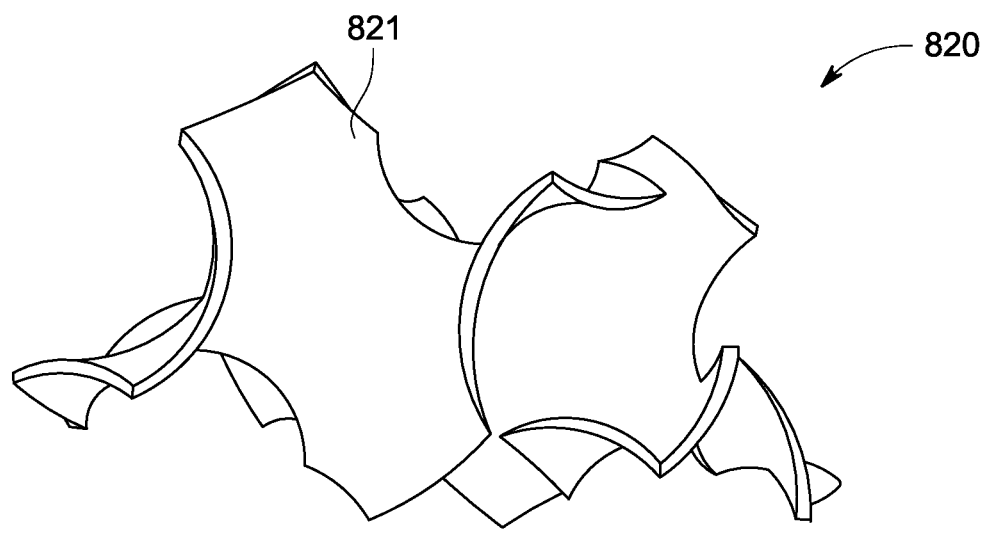
FIG. 8B shows an example Type II Gyroid Pipe.

FIG. 8B shows an example Type II Gyroid Pipe. The configuration 820 includes a Type II Gyroid Pipe (GP) 801.

As noted above with respect to FIG. 8A, GPs may be constructed by joining two GUs of the same type (either both Type I or both Type II) along either long edge a (343a or 343b). A GP of desired length may be obtained by repeating the same process joining GUs long side (a) to long side until the desired length and type of GP is attained, in this case, Type II.

Figure 8C:
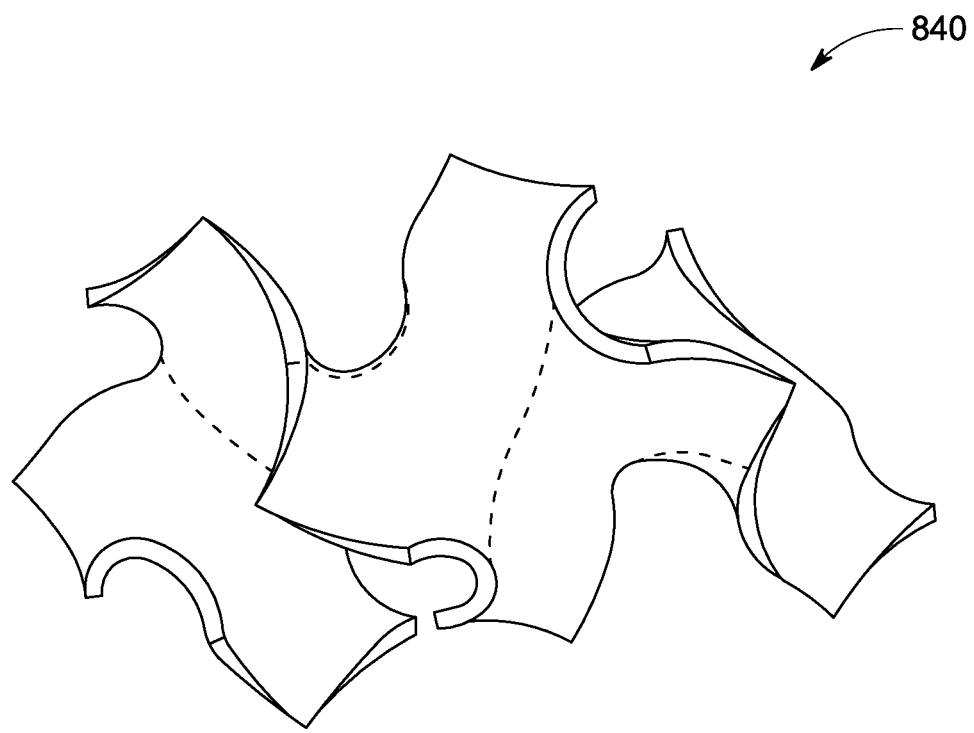
FIG. 8C shows an alternative view of Type I Gyroid Pipe of FIG. 8A.

FIG. 8C shows an alternative view of Type I Gyroid Pipe of FIG. 8A. This figure depicts some of the boundaries of the GUs that are joined to form a Type I GP.

Figure 8D:
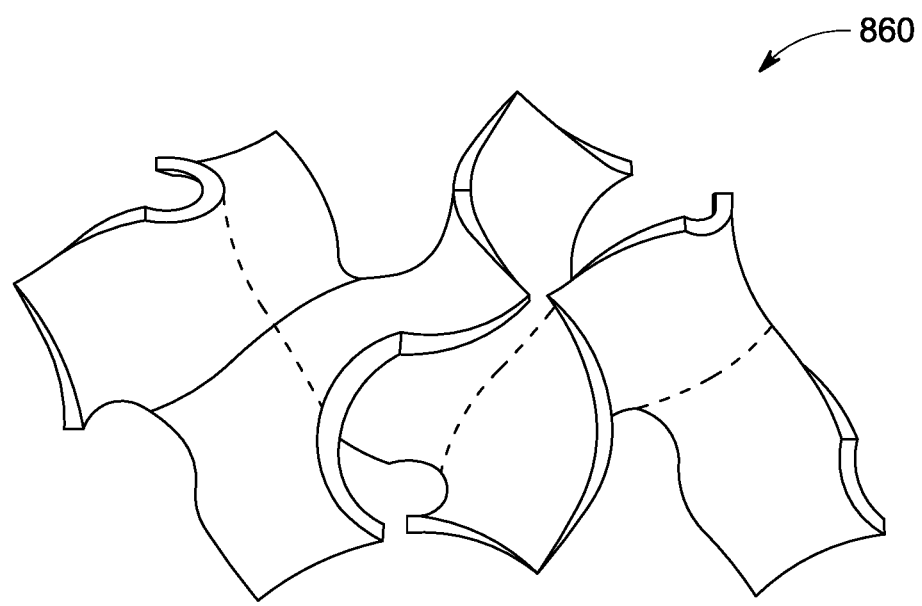
FIG. 8D shows an alternative view of Type II Gyroid Pipe of FIG. 8B.

FIG. 8D shows an alternative view of Type II Gyroid Pipe of FIG. 8B. This figure depicts some of the boundaries of the GUs that are joined to form a Type II GP.

Figure 9:
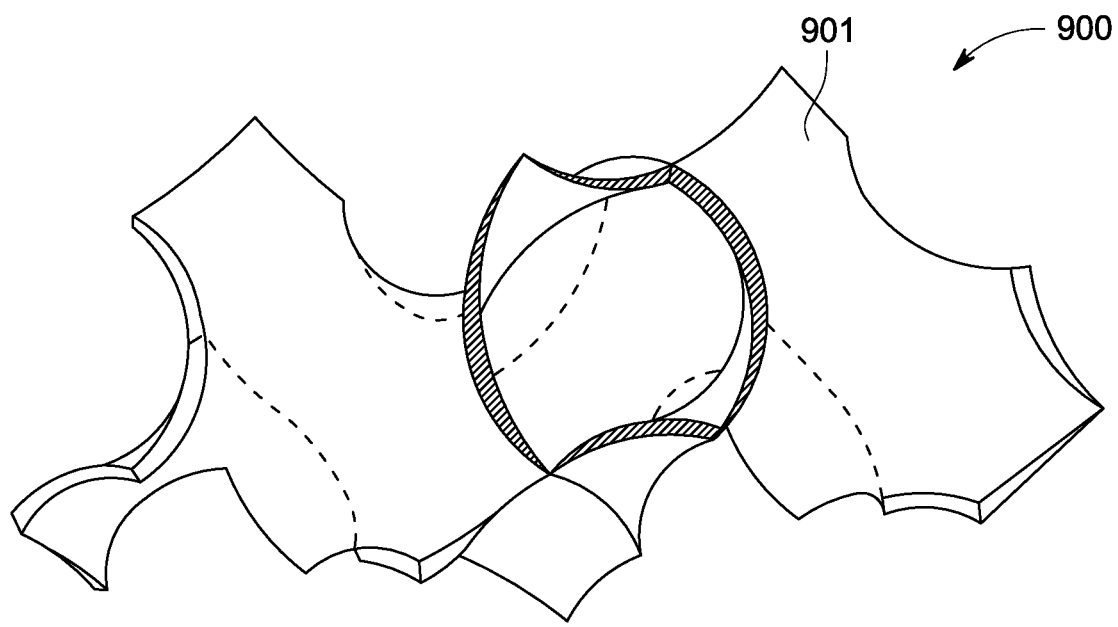
FIG. 9 shows an example attachment site of a Gyroid Pipe.

FIG. 9 shows an example attachment site of a Gyroid Pipe. Configuration 900 includes Gyroid Pipe 901 and shows some of its boundaries and edges.

In various embodiments, the shaded or cross-hatched areas are connecting edges that may be used in attaching GPs together to extend the gyroid pipe to greater lengths.

Figure 10A:
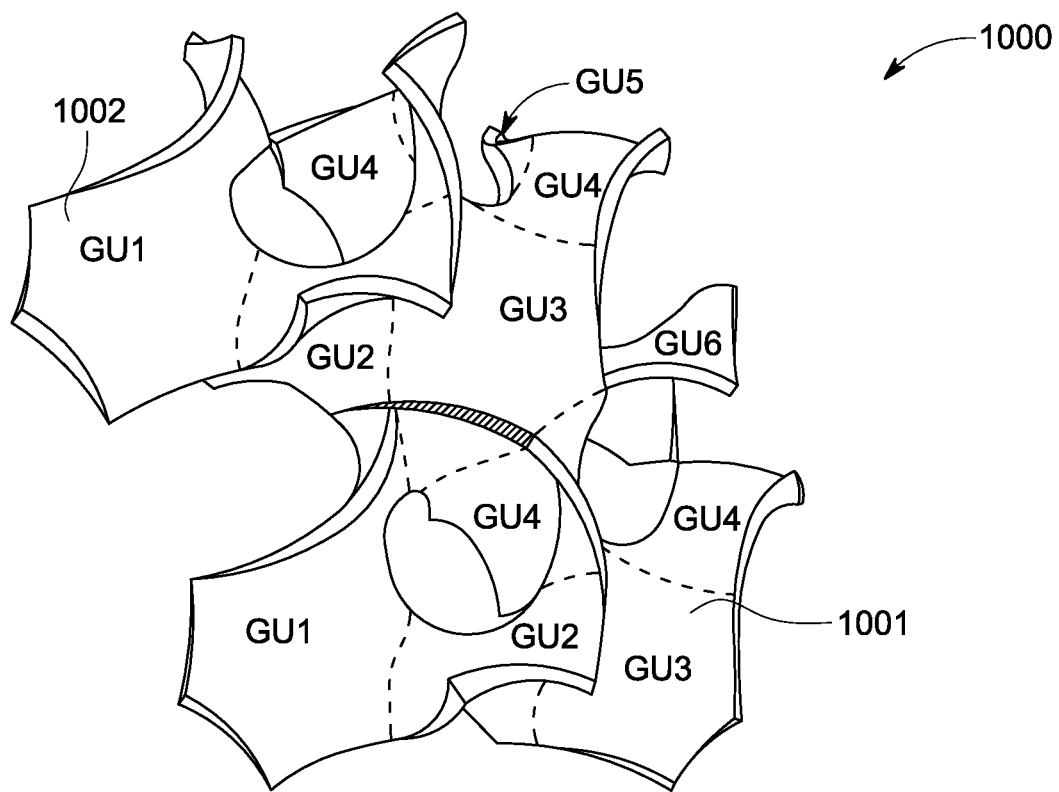
FIG. 10A shows a first method of assembling two Gyroid Pipes together.

FIG. 10A shows a first method of assembling two Gyroid Pipes together. Configuration 1000 includes a GP 1001 and GUs 1002. The GUs from which each GP is formed are labeled as GU1, GU2, GU3, GU4, GU5, and GU6. The boundaries between some of the GUs are depicted with dotted lines.

In various embodiments, GPs of the same type may be laid end to end to a particular desired length. In other embodiments, Type I and Type II GPs may be attached together at an angle, connecting along a long side formed by pipe construction of Type I and a long side of Type 2 or vice versa.

In various embodiments, GPs of the same type may also interconnected by stacking at one of four attachment points, equally spaced around the GP such that looking along length of the pipe, GP can be stacked on top, right side, bottom, or left side.

Figure 10B:
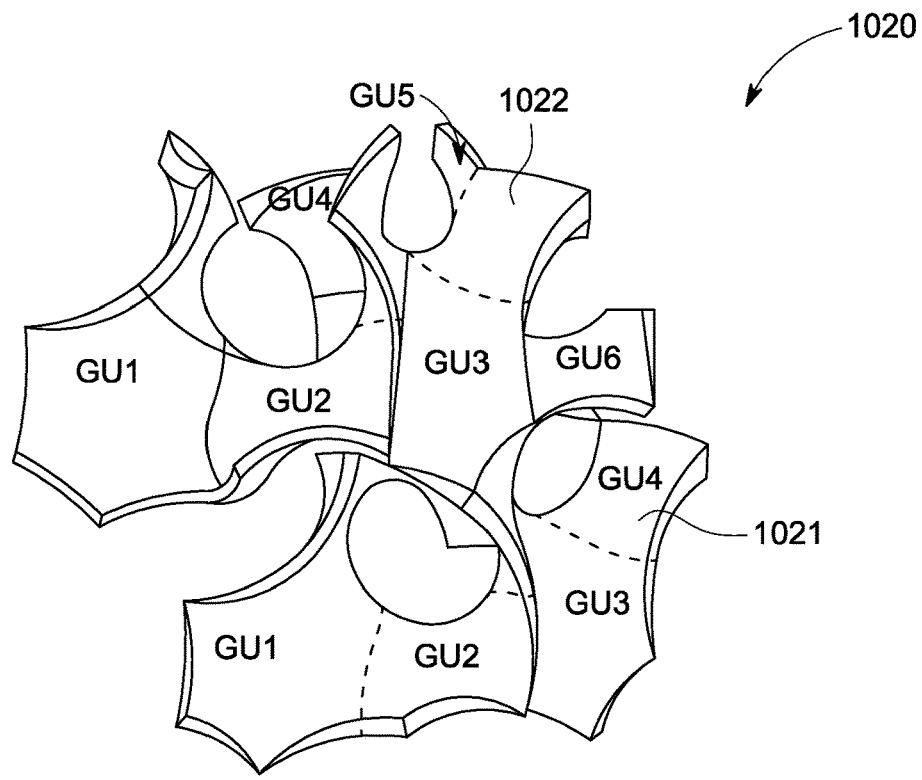
FIG. 10B shows a second method of assembling two Gyroid Pipes together.

FIG. 10B shows a second method of assembling two Gyroid Pipes together. Configuration 1020 includes a GP 1021 and GPs 1022. The GUs from which the GP is formed are labeled as Gill, GU2, GU3, GU4, GU5, and GU6. The boundaries between some of the GUs are depicted with dotted lines.

Figure 11A:
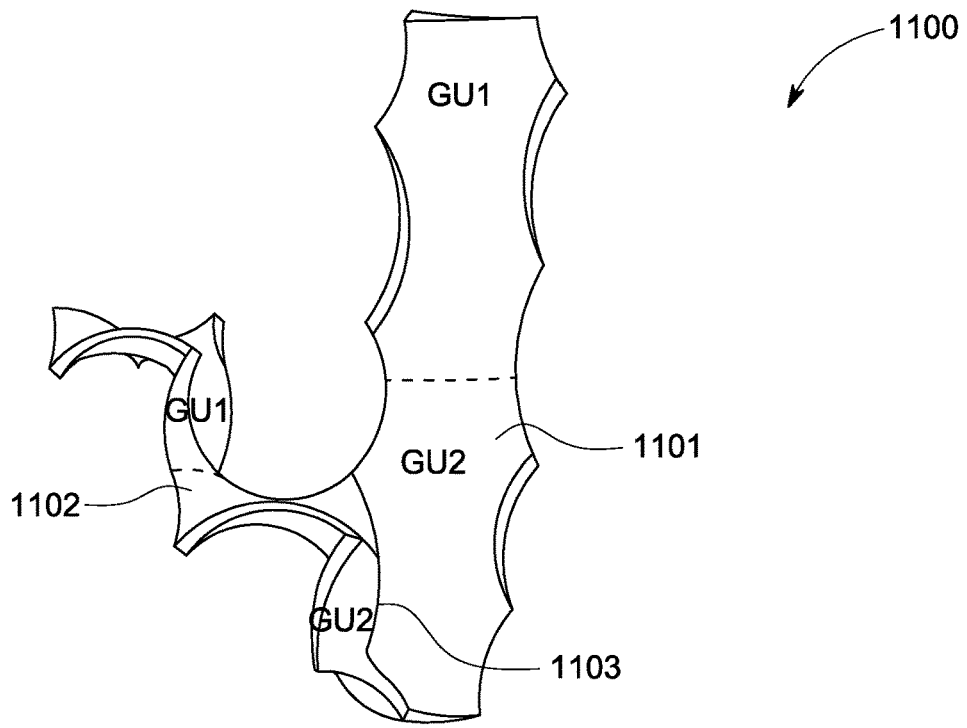
FIG. 11A shows an example first method of assembling gyroid Stock.

FIG. 11A shows an example first method of assembling gyroid Stocks (GS). Configuration 1100 includes a first GS 1101, a second stock 1102 joined along edges 1103. Each of the first GS 1101 and second GS 1102 may include at least two GUs, GU1 and GU2.

As noted above with respect to FIGS. 6A and 6B, GS may be made from two or more GUs to a desired length. Two or more GSs may be assembled together along the short edges (b and b"; see FIG. 3C), as shown.

Figure 11B:
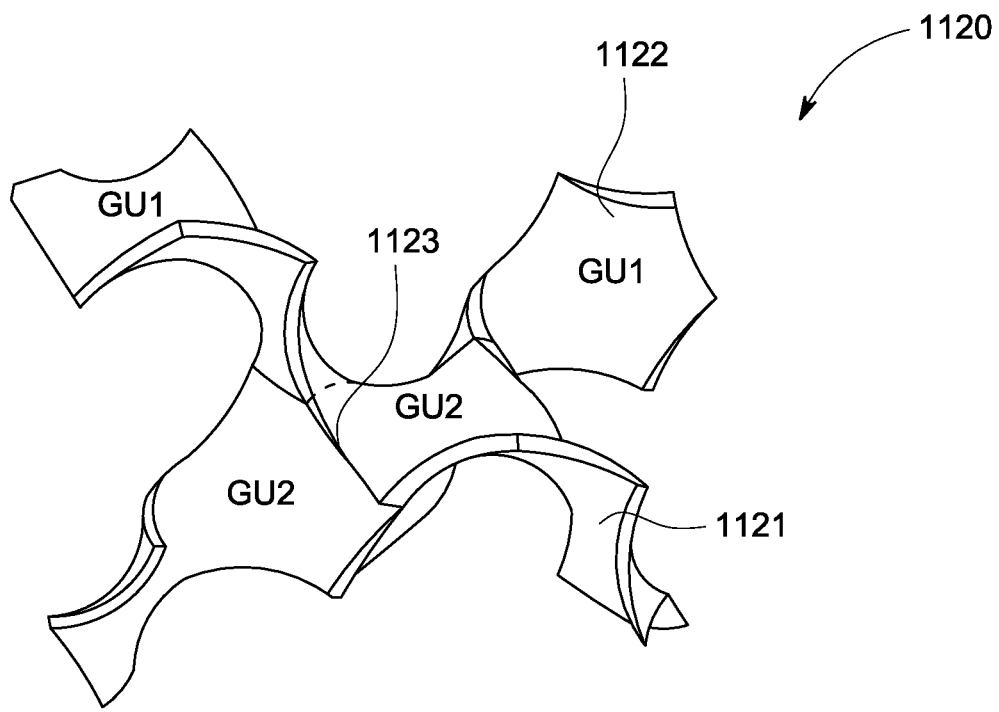
FIG. 11B shows an example second method of assembling gyroid Stock.

FIG. 11B shows an example second method of assembling gyroid Stock. Configuration 1120 includes a first GS 1121, a second stock 1122 joined along edges 1123. Each of the first GS 1121 and second GS 1122 may include at least two GUs, GU1 and GU2.

Two or more GSs may also be assembled together along the long edges (edge a; see FIG. 3C).

Figure 11C:
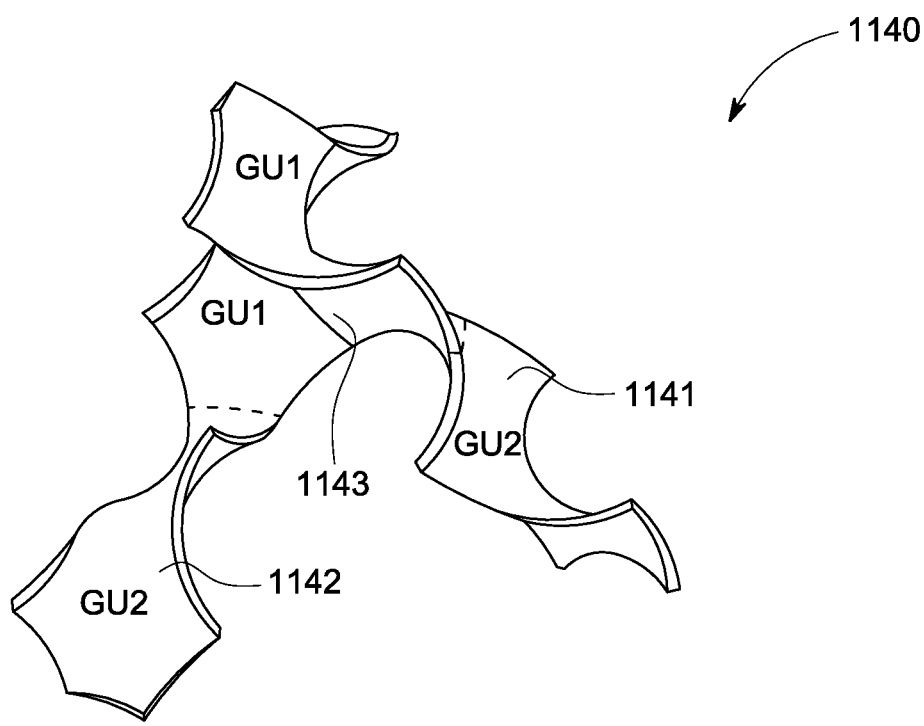
FIG. 11C shows an example third method of assembling gyroid Stock.

FIG. 11C shows an example third method of assembling gyroid Stock. Configuration 1140 includes a first GS 1141, a second stock 1142 joined along edges 1143. Each of the first GS 1141 and second GS 1142 may include at least two GUs, GU1 and GU2.

Two or more GSs may also be assembled together along the short edges (edges b" and b; see FIG. 3C).

Figure 12:
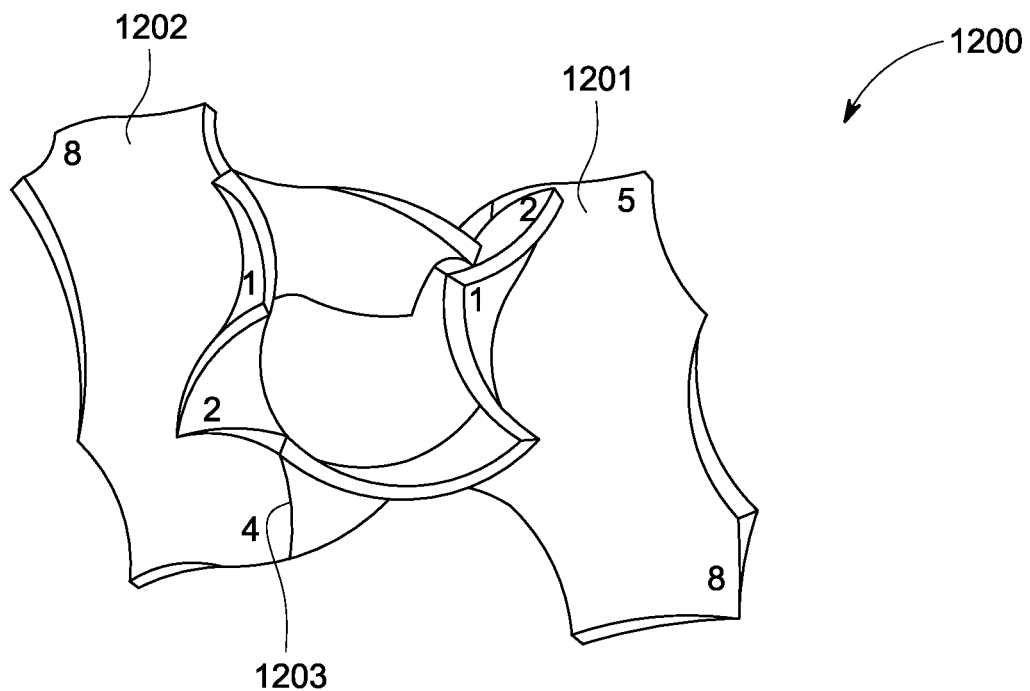
FIG. 12 shows two Unit cells joined.

FIG. 12 shows two Unit cells joined. Configuration 1200 includes a first UC 1201 and a second UC1202, and vertices 1, 2, 4, 5, and 8.

As noted before, a UC may be constructed from two GUs joined along the long sides (343a and 343b or edges a in GU; see FIG. 3C). UCs can be attached along long sides to form a GP with a length of 4 GUs. UCs can be attached from sides 2.5-3 to 10-11 and 10-11 to 2.5-3. (see FIG. 5 for vertex numbering). The dashed numbers, such as 10-11, mean the edge or side between vertices 10 and 11, as numbered in FIG. 5. Similarly, 2.5-3 means approximately the edge segment half-way away from vertex 2 to vertex 3. Pairs of UCs may be joined on three sides. These configurations include the first UC side 9-10 to first UC 3-4, and second UC side 4-5 to second UC side 2.5-3, and second UC 2.5-3 to second UC 10-11.

Figure 13A:
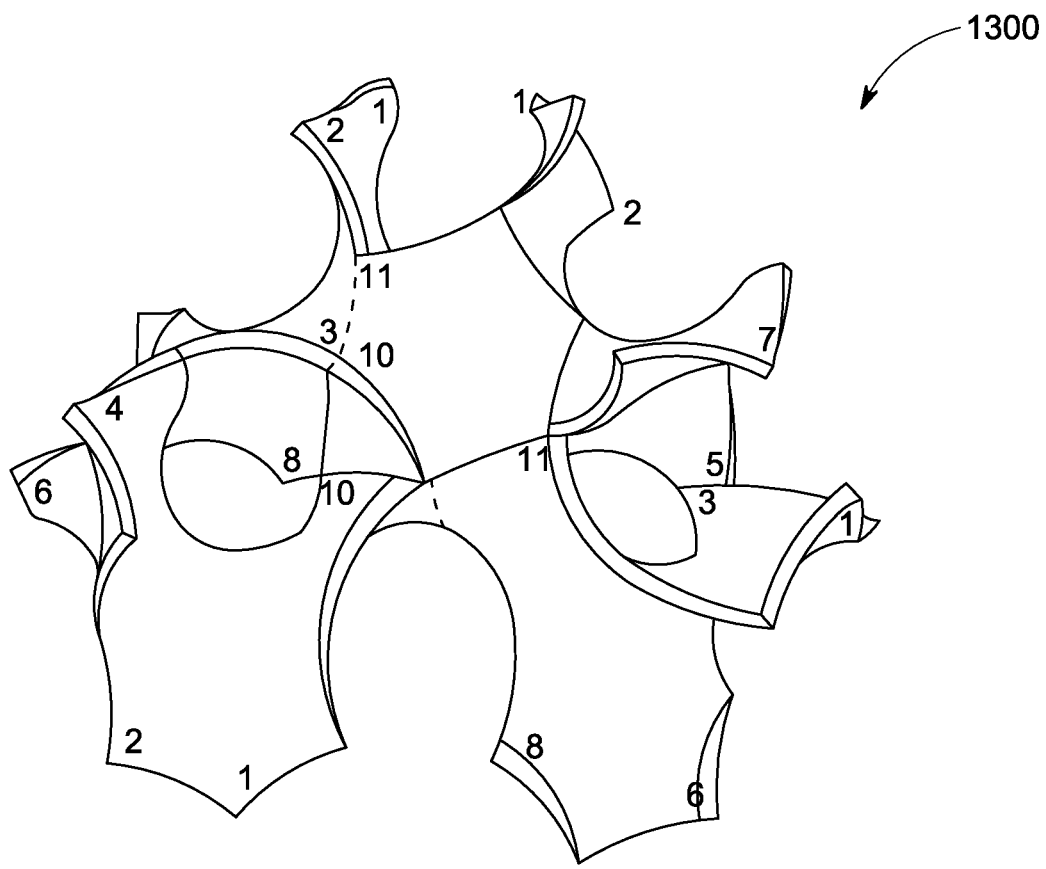
FIG. 13A shows four Unit cells joined, from a first view.

FIG. 13A shows four Unit cells joined, from a first view. Configuration 1300 includes 4 UCs), vertices numbered 1 to 11 that repeat for each UC.

The UCs are attached as described above with respect to FIG. 12.

Figure 13B:
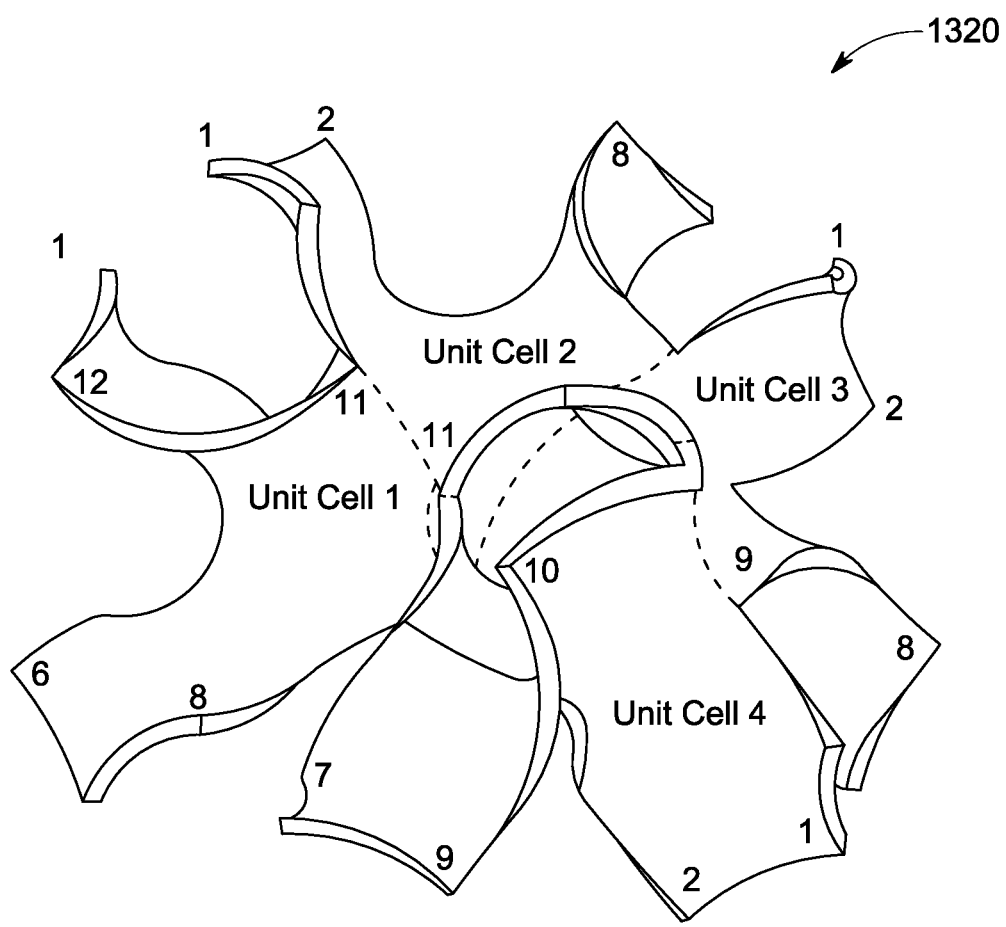
FIG. 13B shows four Unit cells joined, from a second view.

FIG. 13B shows four Unit cells joined, from a second view. Configuration 1320 includes four UCs identified as UC1, UC2, UC3, and UC4, each with vertices numbered 1 to 12 (not all vertices are visible in each view).

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." It is further understood that any phrase of the form "A/B" shall mean any one of "A", "B", "A or B", or "A and B". This construct includes the phrase "and/or" itself.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A method of manufacturing a gyroid structure, the method comprising:
    subtractively manufacturing a plurality of gyroid building blocks having surfaces, vertices and sides, at least one of the plurality of gyroid building blocks comprising a Gyroid Unit (GU) constructed by directly joining one side each of two Skew Hexagons (SH), wherein all the surfaces and sides of the SH are curved;
    identifying the vertices and sides of the plurality of the gyroid building blocks that are joined together to create larger gyroid-based structures;
    mapping the sides from different gyroid building blocks that when joined create a particular type of the larger gyroid-based structure; and joining the different gyroid building blocks at the mapped gyroid building blocks vertices and sides to form the larger gyroid-based structure.

2. The method of claim 1, further comprising maintaining an approximately fixed curvature on the surfaces of the building block.

3. The method of claim 1, further comprising joining the sides of the different gyroid building blocks to maintain an approximately fixed curvature on all surfaces of the resulting larger gyroid-based structures.

4. The method of claim 1, wherein the different gyroid building blocks include a Fundamental Patch (FP).

5. The method of claim 1, wherein the larger gyroid-based structure is one of a Gyroid Unit (GU), a Gyroid Pipe (GP), a Gyroid Stock (GS), a Triunit (TU), and a Unit Cell (UC).

6. The method of claim 5, wherein the larger gyroid-based structure is constructed from one or more of GU, GP, GS, TU, and UC joined together.

7. The method of claim 4, wherein the GU includes a Type I GU and a Type II GU, the sides and vertices of which are different from each other.

8. The method of claim 5, wherein the TU includes a Type I TU and a Type II TU, the sides and vertices of which are different from each other.

9. The method of claim 8, wherein the TU Type I and Type II are combinable in 28 distinct ways to build the larger gyroid-based structure.

10. A method of manufacturing a gyroid structure, the method comprising:

making a first basic gyroid structure and a second basic gyroid structure using subtractive manufacturing techniques, wherein all surfaces and sides of the first and the second basic gyroid structures are curved, and wherein at least one of the first basic gyroid structure and the second basic gyroid structure is a Gyroid Unit (GU) constructed by directly joining one side each of two skew hexagons, wherein all the surfaces and sides of the SHI are curved;

matching one or more sides of the first basic gyroid structure with one or more sides of the second basic gyroid structure; and joining the matched one or more sides of the first basic gyroid structure with the matched one or more sides of the second basic gyroid structure to create a larger compound gyroid structure.

11. The method of manufacturing of claim 10, wherein the first basic gyroid structure and the second basic gyroid structure are of different types.

12. The method of manufacturing of claim 10, wherein the joining of the matched one or more sides comprises at least one of gluing, electrode welding, and chemical welding.

13. The method of manufacturing of claim 10, wherein all surfaces of the first and the second basic gyroid structures have approximately fixed curvatures.

14. The method of manufacturing of claim 10, wherein all surfaces of the larger compound gyroid structure has approximately the same curvatures as the first and the second basic gyroid structures.

* * * * *